United States Patent
Furuta

(10) Patent No.: US 8,942,678 B2
(45) Date of Patent: Jan. 27, 2015

(54) CONTENT DISTRIBUTING SYSTEM, CONTENT DISTRIBUTING APPARATUS, TERMINAL DEVICE AND CONTENT DISTRIBUTING METHOD

(75) Inventor: Daitarou Furuta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1345 days.

(21) Appl. No.: 12/369,933

(22) Filed: Feb. 12, 2009

(65) Prior Publication Data

US 2009/0311996 A1 Dec. 17, 2009

(30) Foreign Application Priority Data

Jun. 13, 2008 (JP) ................................. 2008-155941

(51) Int. Cl.
| | |
|---|---|
| H04M 3/42 | (2006.01) |
| H04K 1/00 | (2006.01) |
| H04K 1/10 | (2006.01) |
| H04L 29/06 | (2006.01) |
| H04W 28/06 | (2009.01) |
| H04W 4/06 | (2009.01) |

(Continued)

(52) U.S. Cl.
CPC .............. *H04L 65/605* (2013.01); *H04W 28/06* (2013.01); *H04W 4/06* (2013.01); *H04L 12/189* (2013.01); *H04L 65/4076* (2013.01); *H04L 65/607* (2013.01); *H04L 65/80* (2013.01); *H04L 65/04* (2013.01); *H04L 12/1859* (2013.01); *H04L 12/5895* (2013.01)
USPC ............................ 455/414.2; 380/269; 380/33

(58) Field of Classification Search
CPC .................. H04W 4/06; H04W 28/06; H04W 12/00–12/12; H04L 5/0053; H04L 69/04; H04L 69/22; H04L 12/189; H04L 65/605; H04L 65/607; H04L 65/80; H04L 65/4076; H04L 12/1859; H04L 12/5895; G06F 17/30153
USPC ........ 709/247; 455/502, 414.2; 370/216, 398; 341/87; 380/269, 33, 34
See application file for complete search history.

(56) References Cited

U.S. PATENT DOCUMENTS

| | | | |
|---|---|---|---|
| 7,539,130 B2 * | 5/2009 | Le et al. | ......................... 370/216 |
| 7,647,429 B2 * | 1/2010 | Lee et al. | ...................... 709/247 |

(Continued)

FOREIGN PATENT DOCUMENTS

| | | |
|---|---|---|
| JP | 2005-528865 | 9/2005 |
| JP | 2007-502073 | 2/2007 |
| JP | 2007-189697 | 7/2007 |

(Continued)

OTHER PUBLICATIONS

European Search Report dated Jun. 25, 2009, from the corresponding European Application.

(Continued)

*Primary Examiner* — Dwayne Bost
*Assistant Examiner* — Larry Sternbane
(74) *Attorney, Agent, or Firm* — Katten Muchin Rosenman LLP

(57) ABSTRACT

In a MBMS system, a base station generates a data control task and a first header control task and second header control task corresponding to each terminal device for a MBMS function module. Each header control task synchronizes a compression state with an associated terminal device and transmits only header information to the terminal device, and the data control task distributes content information to the terminal device separately from header information.

5 Claims, 12 Drawing Sheets

(51) Int. Cl.
*H04L 12/18* (2006.01)
*H04L 12/58* (2006.01)

(56) References Cited

U.S. PATENT DOCUMENTS

2005/0090273 A1* 4/2005 Jin et al. ................. 455/502
2007/0165635 A1 7/2007 Zhang et al.

FOREIGN PATENT DOCUMENTS

| WO | 2004/028042 | 4/2004 |
|---|---|---|
| WO | 2004/042963 | 5/2004 |
| WO | 2005/015881 | 2/2005 |

OTHER PUBLICATIONS

Motorola: "ROHC for E-MBMS" 3GPP Draft; R3-070968, 3rd Generation Partnership Project (3GPP), May 2, 2007.

Notice of Rejection dated Sep. 4, 2012, from corresponding Japanese Application No. 2008-155941.

* cited by examiner

CONTENT DISTRIBUTING SYSTEM, CONTENT DISTRIBUTING APPARATUS, TERMINAL DEVICE AND CONTENT DISTRIBUTING METHOD

CROSS-REFERENCE TO RELATED APPLICATION(S)

This application is based upon and claims the benefit of priority of the prior Japanese Patent Application No. 2008-155941, filed on Jun. 13, 2008, the entire contents of which are incorporated herein by reference.

FIELD

The embodiments discussed herein are directed to a content distributing system that receives a content distributing request from a plurality of terminal devices and distributes contents to the terminal devices as request source.

BACKGROUND

In recent years, there has been devised a technique referred to as Multimedia Broadcast Multicast Service (MBMS) that distributes multi contents such as animation or music over an existing network (such as W-CDMA based 3G mobile phone network). The MBMS utilizes an existing network to broadcast multi contents from a base station to the terminal devices (or multicasts multi contents to a plurality of designated terminal devices).

When the base station broadcasts (or multicasts) multi contents for transmitting to terminal devices, it is required that a header (Internet Protocol <IP>/User Datagram Protocol <UDP>/Real-time Transport Protocol<RTP> header or the like) containing various control information is added to the multicast contents to generate packets. However, since the amount of data of the header occupying the packet is large and the amount of data of the multi contents storable in the packet is limited, the multi contents have not necessarily been distributed efficiently.

On the one hand, various header compressing techniques for compressing a header include Robust Header Compression (ROHC), for example (see Japanese translation No. 2007-502073 of PCT international application). When using the ROHC, it is required that one packet transmission source is for one transmission destination and a compression state between the transmission source and the transmission destination is fed back.

FIG. 15 is a diagram for explaining a base station 10 that transmits packets based on the ROHC and a terminal device 20 that receives the packets. As illustrated, the base station 10 synchronizes the compression state with the terminal device 20 to transit to any of the IR (initialize) state, the First Order (FO) state and the Second Order (SO) state, and generates packets corresponding to the transited state.

There will be explained a packet that is generated by the base station 10 at each state. FIG. 16 is a diagram of one example of data structure of the packet transmitted at each state. FIG. 16A is a diagram of a data structure of an IR packet generated by the base station 10 at the IR state. FIG. 16B is a diagram of a data structure of an FO packet (IR-DYN packet) generated by the base station 10 at the FO state. FIG. 16C is a diagram of a data structure of a SO packet (UO-0/UO-1/UO-2) generated by the base station 10 at the SO state.

As depicted in FIG. 16A, when the base station 10 is at the IR state, the header compression is not performed and the uncompressed header (IP/UDP/RTP header) is stored in the IR packet. The IR packet has image data (multi contents) stored therein in addition to the header.

As depicted in FIG. 16B, when the base station 10 is at the FO state, minimal header compression is performed and the minimally-compressed header (ROHC header) is stored in the FO packet. The header has image data (multi contents) stored therein in addition to the header. The ROHC header contains Dynamic Part (Chain) corresponding to a time stamp of the RTP header.

As depicted in FIG. 16C, when the base station 10 is at the SO state, maximal header compression is performed and the maximally-compressed header (ROHC header) is stored in the SO packet (the amount of data of the header in the SO packet is smaller than that of the header in the FO packet).

On the other hand, the terminal device 20 synchronizes the compression state with the base station 10 to transit to any of the No Context state, the Static Context state and the Full Context state to receive packets from the base station 10. Specifically, when the base station 10 is at the IR state, the terminal device 20 transits to the No Context state and receives the IR packet.

When the base station 10 is at the FO state, the terminal device 20 transits to the Static Context state (or the Full Context state) to receive the FO packet. While the terminal device 20 is receiving the FO packet at the Full Context state, if an elongation error or the like occurs, the terminal device 20 transits to the Static Context state. When the base station 10 is at the SO state, the terminal device 20 transits to the Full Context state to receive the SO packet.

When the header contained in the packet is compressed (when the terminal device 20 has received the FO packet or SO packet from the base station 10), the terminal device 20 elongates compressed header's information and reproduces multi contents by the ROCH technique.

FIG. 17 is a diagram for explaining a state transition sequence of the ROHC. As illustrated, the base station 10 (compressor) transits to the IR state, the FO state and the SO state over time, and transmits the packet corresponding to each state to the terminal device 20 (decompressor). Further, the terminal device 20 also transits its state depending to the state of the base station 10.

The ROHC has not been applicable to the MBMS in the conventional art, and there has been a problem that throughput for multi contents distribution could not be improved.

Specifically, when the ROHC is applied to the MBMS, a plurality of headers need to be transmitted depending on the state of each terminal device. However, since the transmission radio area of the MBMS has only one area (channel) on downlink, data having several types of header cannot be transmitted at the same time.

When the ROHC is applied to the MBMS, the compression state needs to be synchronized between the base station and the terminal devices. However, since the relationship between the base station and the terminal devices is assumed to be 1:n (n is more than 1), the base station could not synchronize the compression state with each terminal device.

SUMMARY

According to an aspect of the invention, a content distributing system includes a plurality of terminal devices; and a content distributing apparatus that distributes contents to the terminal devices. The content distributing apparatus includes a plurality of header control units associated with the terminal devices to which contents are distributed, and a content distributing unit that distributes content information in which highly-compressed header's information and the contents are associated with each other to the terminal devices. The header control unit includes a determining unit that synchronizes a compression state with an associated terminal device and determines a compression state of a header to be transmitted to the terminal device, and a header distributing unit that compresses a header based on a determination result of the determining unit and distributes header compression information as information on a compressed header to a terminal device associated with the header control unit separately from the content information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

DESCRIPTION OF EMBODIMENT(S)

Preferred embodiments of the present invention will be explained with reference to accompanying drawings.

The outline and characteristics of the MBMS system according to the present embodiment will be first explained.

Figure 1:
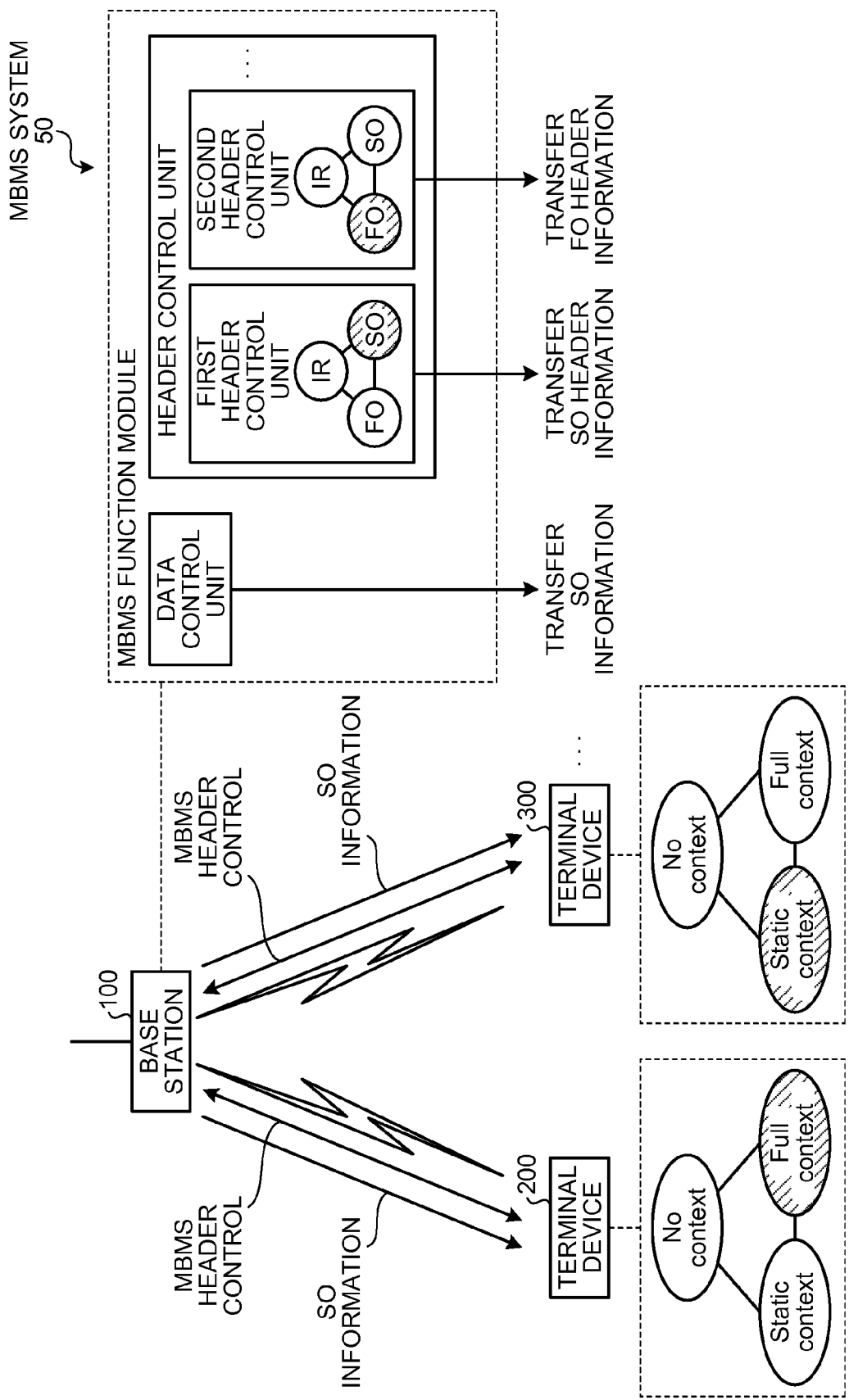
FIG. 1 is a diagram for explaining the outline and characteristics of a MBMS system according to an embodiment.

FIG. 1 is a diagram for explaining the outline and characteristics of the MBMS system according to the present embodiment. As illustrated, an MBMS system 50 comprises a base station 100, and terminal devices 200 and 300 which make radio communication with the base station 100.

In the example depicted in FIG. 1, only the terminal devices 200 and 300 are depicted, but the MBMS system 50 according to the present embodiment is assumed to include more terminal devices. The base station 100 is assumed to be connected to an access gateway (aGW; abbreviation).

The base station 100 is a device that distributes contents (for example, data such as animation, image, music and voice) to the terminal devices 200 and 300. Specifically in the embodiment, the base station 100 has a header control unit corresponding to each terminal device 200 and 300, synchronizes a compression state between the corresponding header control unit and the terminal device, and determines the compression state of the header to compress the header according to the determination result. The header control unit transmits only the header information separately from the contents via a dedicated channel (such as Dedicated Control Channel <DCCH>) to the terminal device.

In the example depicted in FIG. 1, a first header control unit corresponds to the terminal device 200 and the first header control unit and the terminal device 200 synchronize with each other to adjust the compression state of the header. Further a second header control unit corresponds to the terminal device 300 and the second header control unit and the terminal device 300 synchronize with each other to adjust the compression state of the header.

Specifically, when the first header control unit and the terminal device 200 synchronize with each other so that the first header control unit is at the IR state and the terminal device 200 is at the No Context state, information on the uncompressed header (hereinafter, IR header information) is transmitted to the terminal device 200.

When the first header control unit is at the FO state and the terminal device 200 is at the Static Context (or Full Context) state, the header is minimally compressed and information on the minimally-compressed header (hereinafter, FO header information) is transmitted to the terminal device 200.

When the first header control unit is at the SO state and the terminal device 200 is at the Full Context state, the header is maximally compressed and information on the maximally-compressed header (hereinafter, SO header information) is transmitted to the terminal device 200.

On the one hand, the second header control unit and the terminal device 300 also synchronize the compression state with each other similarly as the first header control unit and the terminal device 200, and the second header control unit transmits header information (hereinafter, IR header information, FO header information or SO header information) to the terminal device 200.

Figure 2:
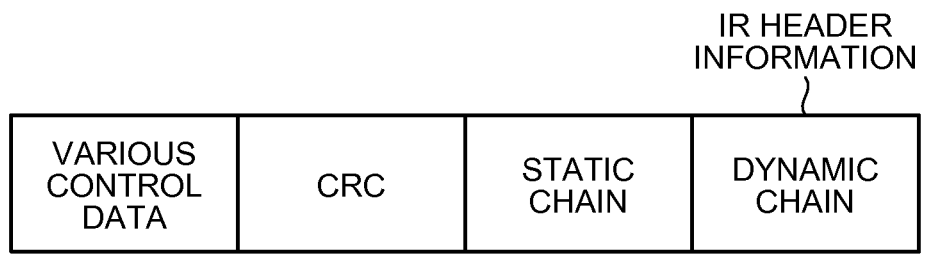
FIG. 2 is a diagram of one example of data structure of IR header information according to the present embodiment.

FIG. 2 is a diagram of one example of data structure of the IR header information according to the present embodiment. As illustrated, the IR header information has various control data, Cyclic Redundancy Check (CRC), Static Chain and Dynamic Chain. The Static Chain is information (such as IP address) on the header portion which is not changed from the starting of the service. The Dynamic Chain is information (such as time stamp contained in the RTP header) on the header portion which is changed over time.

Figure 3:
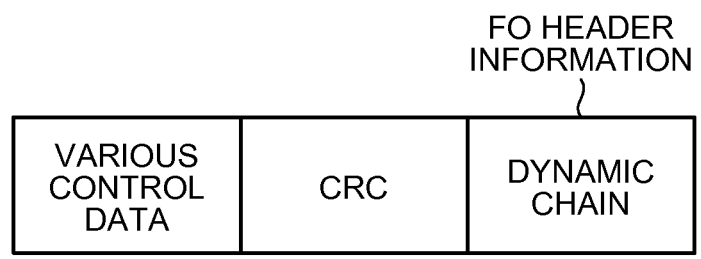
FIG. 3 is a diagram of one example of data structure of FO header information according to the present embodiment.
Figure 4:
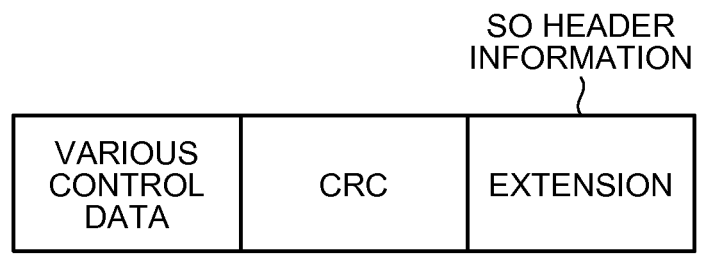
FIG. 4 is a diagram of one example of data structure of SO header information according to the present embodiment.

FIG. 3 is a diagram of one example of data structure of the FO header information according to the present embodiment. As illustrated, the FO header information has various control data, CRC and the Dynamic Chain. FIG. 4 is a diagram of one example of data structure of the SO header information according to the present embodiment. As illustrated, the SO header information has various control data, CRC and Extension as additional information.

Figure 5:
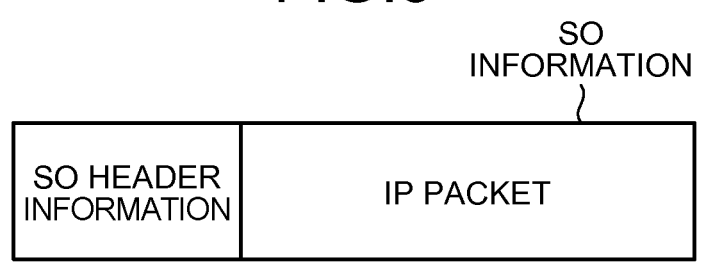
FIG. 5 is a diagram of one example of data structure of SO information.

The base station 100 generates the SO information in which the contents and the maximally-compressed header's information are associated with each other by the data control unit, and transmits the generated SO information via a dedicated channel (such as Multicast Traffic Channel <MTCH>) to each terminal device 200 and 300. The SO information is transmitted to each terminal device 200 and 300 separately from the header information transmitted from the header control unit. FIG. 5 is a diagram of one example of data structure of the SO information. As illustrated, the SO information has the SO header information (see FIG. 4) and an IP packet having the contents stored therein.

The terminal device 200 and 300 utilizes the IR header information, the FO header information or the SO header information received from the header control unit associated with its terminal device and elongates the SO header information contained in the SO information (generates the Static Chain and the Dynamic Chain) to reproduce the contents received from the base station 100.

The method for elongating the SO header information conforms to the conventional ROHC. In other words, the Static Chain utilizes Static Chain contained in the IR header information as it is. The Dynamic Chain utilizes Dynamic Chain which is inferred from the Dynamic Chain contained in the IR header information and the FO header information. For example, if a time stamp contained in the Dynamic Chain of the FO header information is denoted as 1, 2, 3, the time stamp of the next-received Dynamic Chain can be assumed as 4.

In this manner, in the MBMS system 50 according to the present embodiment, the base station 100 utilizes the header control unit corresponding to each terminal device 200 and 300 to synchronize with each terminal device 200 and 300, the header control unit transmits only the header information to the terminal device, and the data control unit transmits the SO information to the terminal device. Since the terminal device 200 and 300 elongates the SO header information contained in the SO information and reproduces the contents, the ROHC technique is applicable to the MBMS, thereby improving the throughput.

Figure 6:
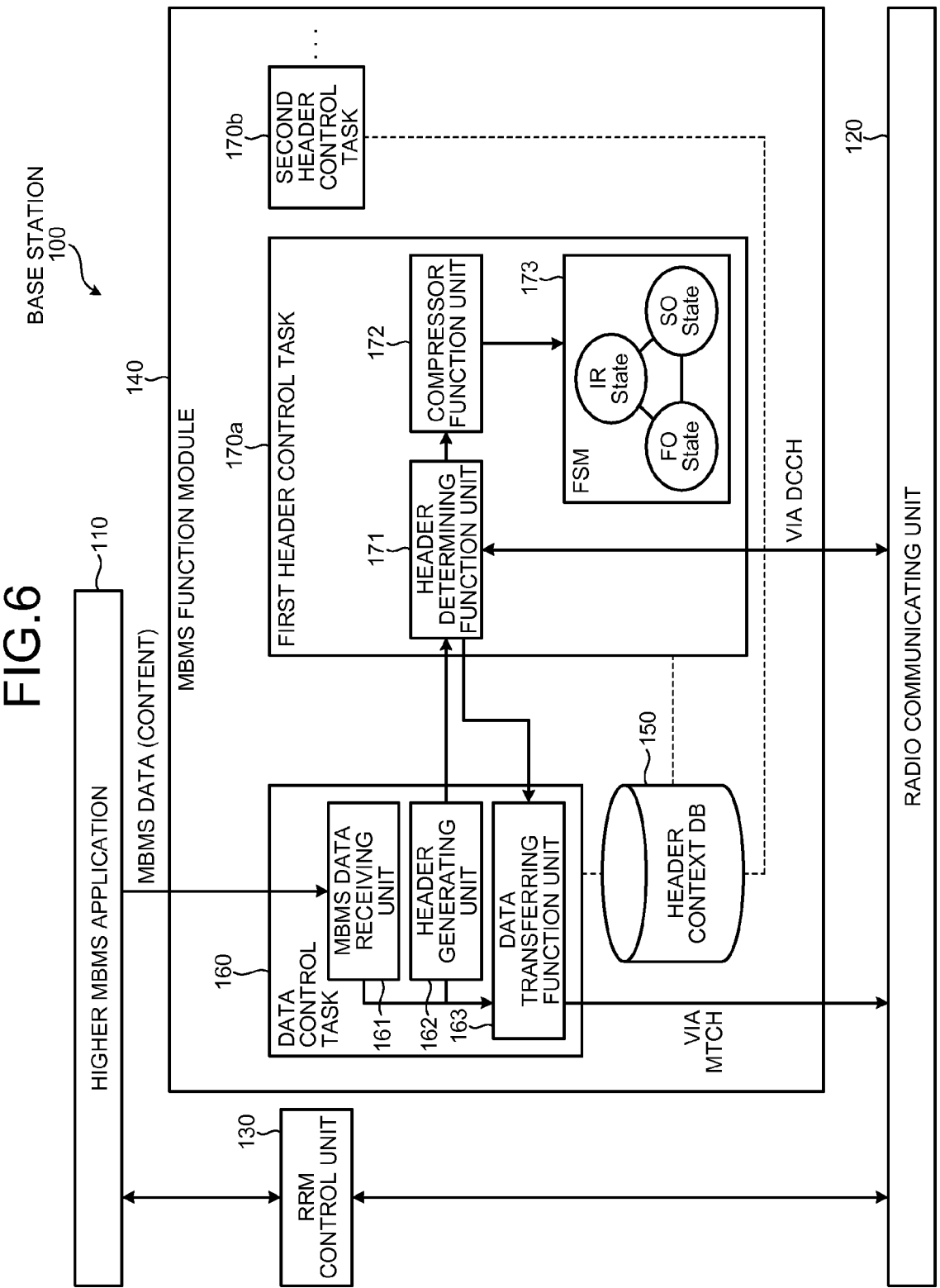
FIG. 6 is a functional block diagram of a structure of a base station according to the present embodiment.

Next, the structure of the base station 100 depicted in FIG. 1 will be explained. FIG. 6 is a functional block diagram of the structure of the base station 100 according to the present embodiment. As illustrated, the base station 100 comprises a higher MBMS application 110, a radio communicating unit 120, a Radio Resource Management (RRM) control unit 130 and a MBMS function module 140.

The higher MBMS application 110 is a unit for outputting multi contents information to the MBMS function module 140 when acquiring a MBMS service request from the terminal device 200 or terminal device 300. The multi contents information output by the higher MBMS application 110 is data which has been transferred from each streaming server (not depicted) to the base station 100. The radio communicating unit 120 is a unit for making radio data communication with the terminal device 200 and 300 (or others).

The RRM control unit 130 is a unit for, when acquiring a MBMS service request from the terminal device 200 and 300, responding to the MBMS service request and generating a data control task 160 and a header control task corresponding to the terminal device which has received the service request in the MBMS function module 140.

As one example, the RRM control unit 130 generates a first header control task 170*a* corresponding to the terminal device 200 when acquiring the MBMS service request from the terminal device 200. Further the RRM control unit 130 generates a second header control task 170*b* when acquiring the MBMS service request from the terminal device 300.

The RRM control unit 130 makes a MBMS-only Uplink (UL)/Downlink (DL) bearer generating request to the terminal device as the service request source when acquiring the MBMS service request from the terminal device. The UL/DL bearer is a control channel until the header compression transits to the high compression mode in both the compressor (header control task of the base station 100) and the decompressor (header control task of the terminal device).

The MBMS function module 140 has a header context DB 150, the data control task 160, the first header control task 170*a* and the second header control task 170*b*. As one example, only the first and second header control tasks 170*a* and 170*b* are depicted here but the header control tasks are present as many as the terminal devices as the content transmission destination. In other words, when n (n is 1 or more) terminal devices as the content transmission destination are present, n header control tasks are present.

The header context DB 150 is a storing unit for storing various information of the terminal device as the MBMS service destination. Specifically, the header context DB 150 has information such as Static Chain and Dynamic Chain of the terminal device as the service destination stored therein.

The data control task 160 is a unit for transmitting contents (SO information; see FIG. 5) to the terminal devices as the MBMS service request source, and has a MBMS data receiving unit 161, a header generating unit 162 and a data transferring function unit 163.

The MBMS data receiving unit 161 is a unit for receiving the contents from the higher MBMS application 110 and outputting the received contents to the data transferring function unit 163. The header generating unit 162 is a unit for generating the header (SO header information) of the terminal device as the service destination and outputting the generated SO header information to the data transferring function unit 163.

The header generating unit 162 acquires the Static Chain and the Dynamic Chain of the terminal device as the service destination with reference to the header context DB 150, and generates the SO header information based on the acquired information. In the method for generating the SO header information, the header generating unit 162 conforms to the conventional ROCH.

The header generating unit 162 outputs all the header information of the terminal device as the service destination (information conforming to Request For Comment <RFC> such as Static Chain and Dynamic Chain), if it being generated in the RRM control unit 130, to the first header control task 170*a* (second header control task 170*b*).

The header control task (first header control task 170*a* and second header control task 170*b*) is a unit for synchronizing the compression state with the associated terminal device and determining the compression state of the header to be transmitted to the terminal device to compress the header based on the determination result. The header control task transmits information on the compressed header to the terminal device via a different channel (DCCH) from a channel (MTCH) for transmitting the SO information by the data control task 160.

The header control task will be explained here using the first header control task 170*a*. The explanation for the second header control task 170*b* will be omitted since the associated terminal device is different from that of the first header control task 170*a*.

The first header control task 170*a* comprises a header determining function unit 171, a compressor function unit 172 and a FSM (sequencer) 173. The header determining function unit 171 is a unit for receiving a feedback packet from the terminal device 200 to synchronize the compression state therewith and transmitting the IR header information, the FO header information or the SO header information to the terminal device 200 depending on the compression state.

The header determining function unit 171 makes a request of generating the FSM 173 to the compressor function unit 172 at the start of the MBMS service. Then the header determining function unit 171 transits the state of the FSM 173 based on the feedback packet received from the terminal device 200 (transits the state of the FSM 173 via the compressor function unit 172).

The header determining function unit 171 generates the IR header information when the FSM 173 is at the IR state. Then the header determining function unit 171 transmits the IR header information via the DCCH to the terminal device 200. The header determining function unit 171 registers the as-needed changing Dynamic Chain information into the header context DB 150.

The header determining function unit 171 transits the state of the FSM 173 from the IR state to the FO state when receiving the feedback packet (ACKnowledgment <ACK>) from the terminal device 200 after transmitting the IR header information to the terminal device 200. Alternatively, the header determining function unit 171 transits the state of the FSM to the FO state when a predetermined time elapses after the state of the FSM 173 is set at the IR state.

The header determining function unit 171 generates the FO header information when the FSM 173 is at the FO state. Then the header determining function unit 171 transmits the FO header information via the DCCH to the terminal device 200.

The header determining function unit 171 transits the state of the FSM 173 from the FO state to the SO state when receiving the feedback packet (ACK) from the terminal device 200 after transmitting the FO header information to the terminal device 200. Alternatively, the header determining function unit 171 transits the state of the FSM 173 to the SO state when a predetermined time elapses after the state of the FSM 173 is set at the FO state.

The header determining function unit 171 generates the SO header information when the FSM 173 is at the SO state. Then the header determining function unit 171 transmits the SO header information via the DCCH to the terminal device 200.

The header determining function unit 171 transits the state of the FSM 173 to the FO state when an error occurs in the terminal device 200 and the feedback packet (Negative Acknowledgment <NACK>) is received from the terminal device 200 while the FSM 173 is being at the SO state.

The header determining function unit 171 transits the state of the FSM 173 to the IR state when an error occurs in the terminal device 200 and the feedback packet (NACK) is received from the terminal device 200 while the FSM 173 is being at the FO state.

The compressor function unit 172 is a unit for generating the FSM 173 and transiting the state of the FSM 173 according to a control instruction input from the header determining function unit 171. The FSM 173 is a unit for managing the compression state which synchronizes between the first header control task 170a and the terminal device. The initial state of the FSM 173 enters the IR state and transits to the FO state or SO state under control of the compressor function unit 172.

Figure 7:
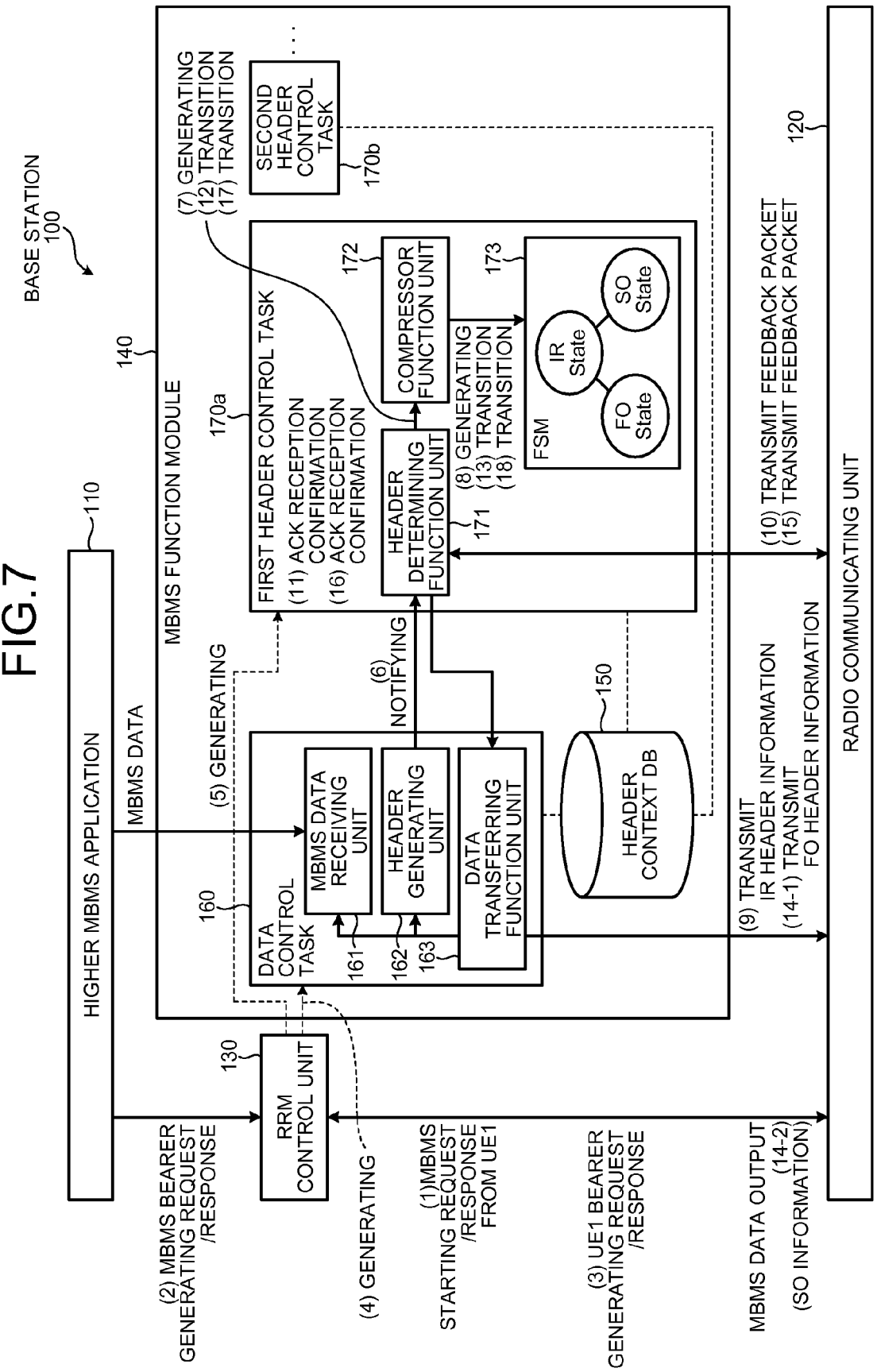
FIG. 7 is a diagram of a processing sequence of the base station according to the present embodiment.

A processing sequence of the base station 100 depicted in FIG. 6 will be explained below. FIG. 7 is a diagram illustrating the processing sequence of the base station 100 according to the present embodiment. In the base station 100, the RRM control unit 130 responds to the terminal device 200 for the MBMS request when acquiring the MBMS request from the terminal device 200 (see (1) in FIG. 7).

The RRM control unit 130 outputs the MBMS bearer generating request to the higher MBMS application 110 and acquires a response from the higher MBMS application 110 (see (2) in FIG. 7). Subsequently, the RRM control unit 130 transmits a bearer generating (UL/DL) request to the terminal device 200 and acquires a response from the terminal device 200 (see (3) in FIG. 7) to generate the data control task 160 and the first header control task 170a (see (4), (5) in FIG. 7).

The header generating unit 162 notifies the header determining function unit 171 of all the header information (see (6) in FIG. 7), the header determining function unit 171 makes a request of generating the FSM 173 to the compressor function unit 172 (see (7) in FIG. 7), and the compressor function unit 172 generates the FSM 173 (see (8) in FIG. 7).

Subsequently, the header determining function unit 171 transmits the IR header information to the terminal device 200 (see (9) in FIG. 7) and receives the feedback packet (ACK) from the terminal device 200 (see (10) in FIG. 7).

The header determining function unit 171 performs ACK reception confirmation (see (11) in FIG. 7) and then outputs a request of transiting the FSM 173 to the compressor function unit 172 (see (12) in FIG. 7), and the compressor function unit 172 transits the state of the FSM 173 from the IR state to the FO state (see (13) in FIG. 7).

The header determining function unit 171 transmits the FO header information to the terminal device 200 when the state of the FSM 173 transits to the FO state (see (14-1) in FIG. 7). After the FO header information is transmitted to the terminal device 200, the data transferring function unit 163 outputs the SO information to each terminal device (see (14-2) in FIG. 7).

The header determining function unit 171 receives the feedback packet (ACK) from the terminal device 200 (see (15) in FIG. 7), performs ACK reception confirmation (see (16) in FIG. 7), and then outputs a request of transiting the FSM 173 to the compressor function unit 172 (see (17) in FIG. 7).

The compressor function unit 172 transits the state of the FSM 173 from the FO state to the SO state (see (18) in FIG. 7) and the header determining function unit 171 transmits the SO header information to the terminal device 200.

Figure 8:
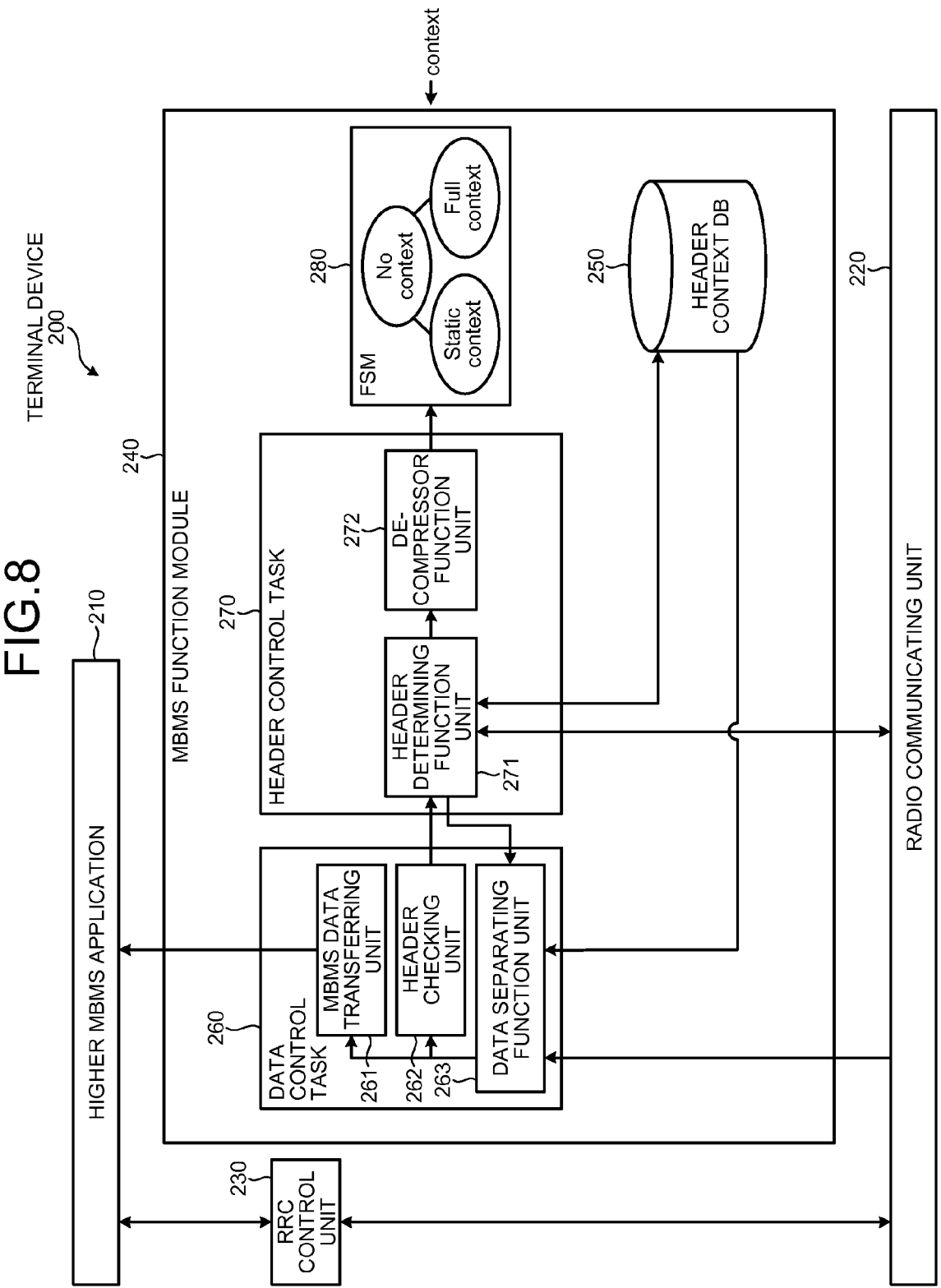
FIG. 8 is a functional block diagram of a structure of a terminal device according to the present embodiment.

The structure of the terminal device 200 depicted in FIG. 1 will be below explained (the structure of the terminal device 300 is similar to that of the terminal device 200 and explanation thereof will be omitted). FIG. 8 is a functional block diagram of the structure of the terminal device 200 according to the present embodiment. As illustrated, the terminal device 200 comprises a higher MBMS application 210, a radio communicating unit 220, a RRC control unit 230 and an MBMS function module 240.

The higher MBMS application 210 is a unit for, when acquiring a content distributing request from a user via an input device (not depicted), outputting a MBMS bearer generating request to the RRC control unit 230. The higher MBMS application 210 outputs contents to a display, speaker or the like (not depicted) when acquiring the contents from a data control task 260. The radio communicating unit 220 is a unit for making radio data communication with the base station 100 and the like.

The RRC control unit 230 is a unit for, when making a MBMS starting request to the base station 100, generating the data control task 260 and a header control task 270 in the MBMS function module 240.

The MBMS function module 240 comprises a header context DB 250, the data control task 260 and the header control task 270. The header context DB 250 is a unit for storing Static Chain, Dynamic Chain and the like of the IR header information and the FO header information which are transmitted from the base station 100.

The data control task 260 is a unit for receiving the SO information which is transmitted from the base station 100 via the MTCH and elongating the header contained in the SO information based on the reception permission and the compressed context information from the header control task 270. The data control task 260 comprises an MBMS data transferring unit 261, a header checking unit 262 and a data separating function unit 263.

The MBMS data transferring unit 261 is a unit for associating the elongated header information with the content information and outputting the same to the higher MBMS application 210. The header checking unit 262 is a unit for detecting an error (CRC error, SN number mismatching and the like) of the header elongated by the data separating function unit. The header checking unit 262, when an error is detected, outputs the information indicating that the error has been detected to a header determining function unit 271.

The data separating function unit 263 is a unit for, when acquiring the reception permission from the header control task 270, receiving the SO information via the MTCH and elongating the SO header information contained in the SO information. The data separating function unit 263 refers to the header context DB 250 when elongating the SO header information to add Static Chain to the SO header information and to estimate Dynamic Chain, and adds the estimated Dynamic Chain to the SO header information. The data separating function unit 263 associates the elongated header information with the content information and outputs the same to the MBMS data transferring unit 261.

The header control task 270 is a unit for preparing an FSM 280 conforming to the ROHC and controlling the FSM 280 until the highly-compressed header can be elongated. The header control task 270 controls the state of the FSM 280 again when acquiring the information indicating that the header error has been detected from the header checking unit 262. The header control task 270 comprises the header determining function unit 271 and a decompressor function unit 272.

The header determining function unit 271 makes a request of generating the FSM 280 to the decompressor function unit 272 at the time of starting the MBMS service. The header determining function unit 271 returns the feedback packet in response to the packet (IR header information, FO header information, SO header information) transmitted from the base station 100 so as to synchronize the compression state with the base station 100.

The header determining function unit 271 outputs the feedback packet to the base station 100 via the DCCH when acquiring the IR header information (when acquiring the same several times). Thereafter, when the header determining function unit 271 receives the FO header information, the state of the FSM 280 is transited from the No context state to the Full context state (may be transited to the Static context state).

The header determining function unit 271 transits the state of the FSM 280 to the Full context state (or transits it to the Static context state) and then transmits the feedback packet to the base station 100 to output the reception permission to the data separating function unit 263. The header determining function unit 271 registers the IR header information, the FO header information and the SO header information, which are transmitted from the base station 100, into the header context DB 250.

The decompressor function unit 272 is a unit for generating the FSM 280 and transiting the state of the FSM 280 in response to the control instruction input by the header determining function unit 271. The FSM 280 is a unit for managing the compression information which is synchronized between the header control task 270 and the terminal device. The initial state of the FSM 280 enters the No context state and is controlled by the decompressor function unit 272 to transit to the Static Context state or Full context state.

Figure 9:
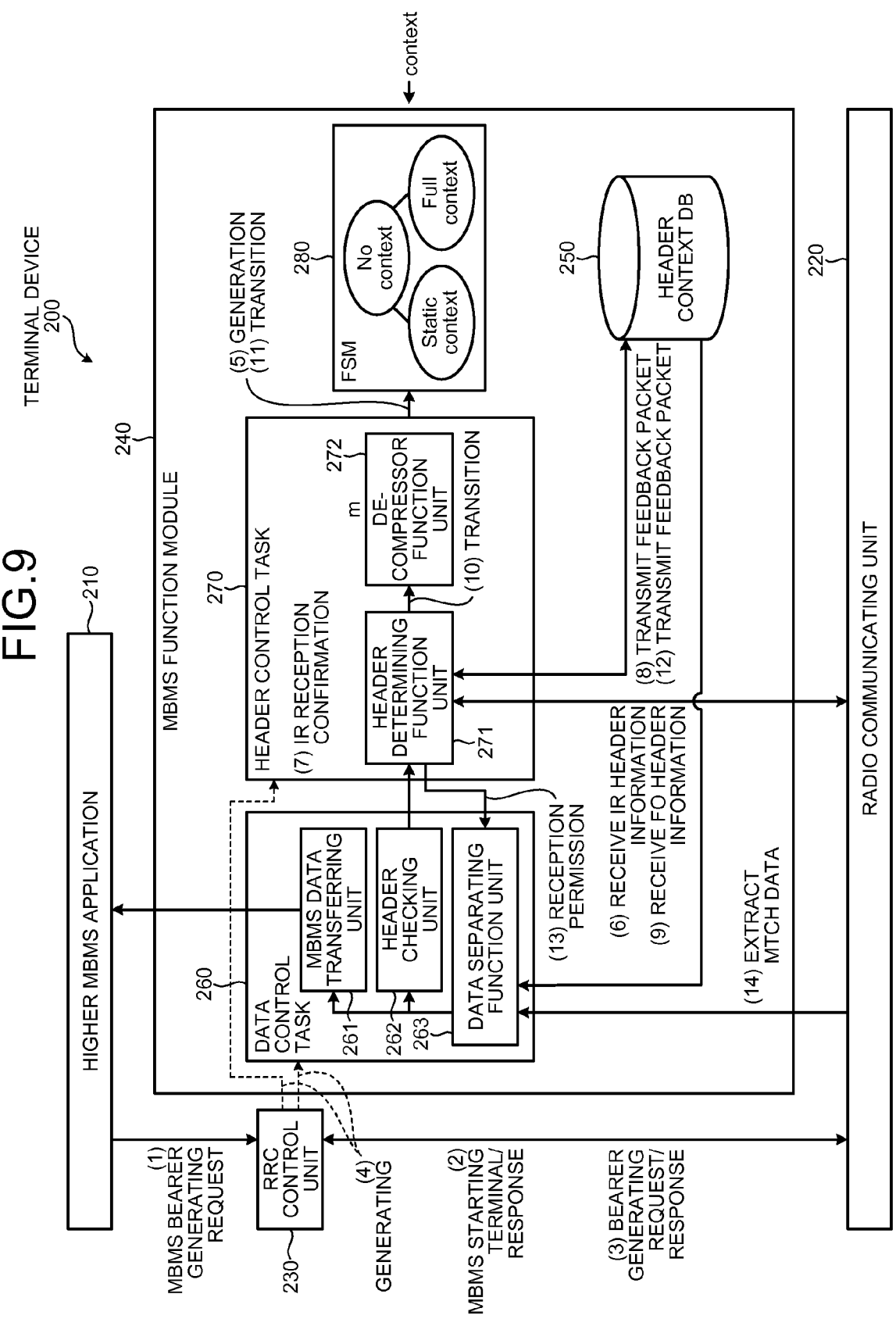
FIG. 9 is a diagram of a processing sequence of the terminal device according to the present embodiment.
Figure 10:
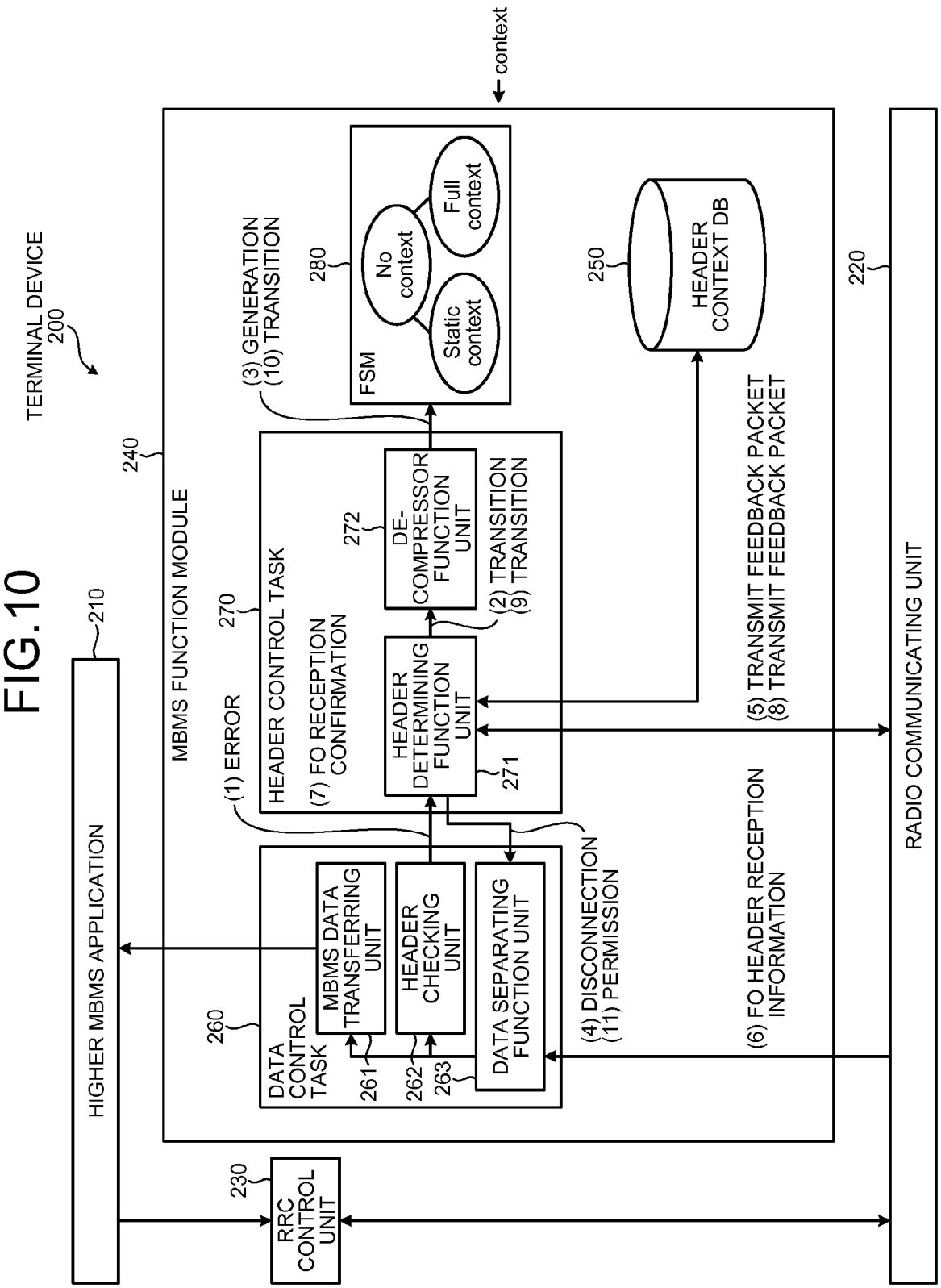
FIG. 10 is a diagram of a processing sequence of the terminal device when an error is detected at the time of elongating a compressed header.

A processing sequence of the terminal device 200 depicted in FIG. 8 will be below explained. FIG. 9 is a diagram of the processing sequence of the terminal device 200 according to the present embodiment, and FIG. 10 is a diagram of the processing sequence of the terminal device 200 when an error is detected at the time of elongating a compressed header.

In the terminal device 200, the RRC control unit 230 acquires a MBMS bearer generating request from the higher MBMS application 210 (see (1) in FIG. 9), transmits a MBMS starting request to the base station 100 and receives the response from the base station 100 (see (2) in FIG. 9). Further, when the bearer generating (UL/DL) request is acquired from the base station 100, a response is made to the base station 100 (see (3) in FIG. 9).

The RRC control unit 230 generates the data control task 260 and the header control task 270 (see (4) in FIG. 9) and the decompressor function unit 272 generates the FSM 280 (see (5) in FIG. 9).

The header determining function unit 271 receives the IR header information (see (6) in FIG. 9), performs IR reception confirmation (see (7) in FIG. 9), and transmits the feedback packet (ACK) to the base station 100 (see (8) in FIG. 9). The header determining function unit 271 receive the IR header information, sequentially registers the Static Chain and the Dynamic Chain contained in the IR header information into the header context DB 250, and transmits the feedback packet (ACK) to the base station 100 when it is confirmed that the SO header information can be reliably elongated based on the information registered in the header context DB 250.

The header determining function unit 271 receives the FO header information from the base station 100 (see (9) in FIG. 9) and outputs a request of transiting the FSM 280 to the decompressor function unit 272 (see (10) in FIG. 9), and the decompressor function unit 272 transits the state of the FSM 280 from the No context state to the Full context state (see (11) in FIG. 9).

The header determining function unit 271 transmits the feedback packet (ACK) to the base station 100 (see (12) in FIG. 9) and outputs the reception permission to the data separating function unit 263 (see (13) in FIG. 9). The data separating function unit 263 acquires the reception permission and then receives the SO information transmitted via the MTCH (see (14) in FIG. 9).

There will be below explained a processing of the terminal device 200 when an error is detected at the time of elongating the compressed header. As depicted in FIG. 10, when an error (CRC error, SN number mismatching) of the SO information is detected, the header checking unit 262 notifies the header determining function unit 271 of the error (see (1) in FIG. 10).

The header determining function unit 271 outputs a request of transiting the FSM 280 to the decompressor function unit 272 (see (2) in FIG. 10) and the decompressor function unit 272 transits the state of the FSM 280 from the Full context state to the Static context state (see (3) in FIG. 10).

The header determining function unit 271 outputs a disconnecting request to the data separating function unit 263 (see (4) in FIG. 10), transmits the feedback packet (NACK) to the base station 100 (see (5) in FIG. 10), and receives the FO header information from the base station 100 (see (6) in FIG. 10).

The header determining function unit 271 performs FO reception confirmation (see (7) in FIG. 10) and transmits the feedback packet (ACK) to the base station 100 (see (8) in FIG. 10). The header determining function unit 271 receives the FO header information, sequentially registers the Dynamic Chain contained in the FO header information into the header context DB 250, and transmits the feedback packet (ACK) to the base station 100 when it is confirmed that the SO header information can be reliably elongated based on the information registered in the header context DB 250.

The header determining function unit 271 outputs a request of transiting the FSM 280 to the decompressor function unit 272 (see (9) in FIG. 10) and the decompressor function unit 272 transits the state of the FSM 280 from the Static context state to the Full context state (see (10) in FIG. 10).

The header determining function unit 271 outputs the reception permission to the data separating function unit 263 (see (11) in FIG. 10) and the data separating function unit 263 restarts the SO information reception which has been interrupted.

Figure 11:
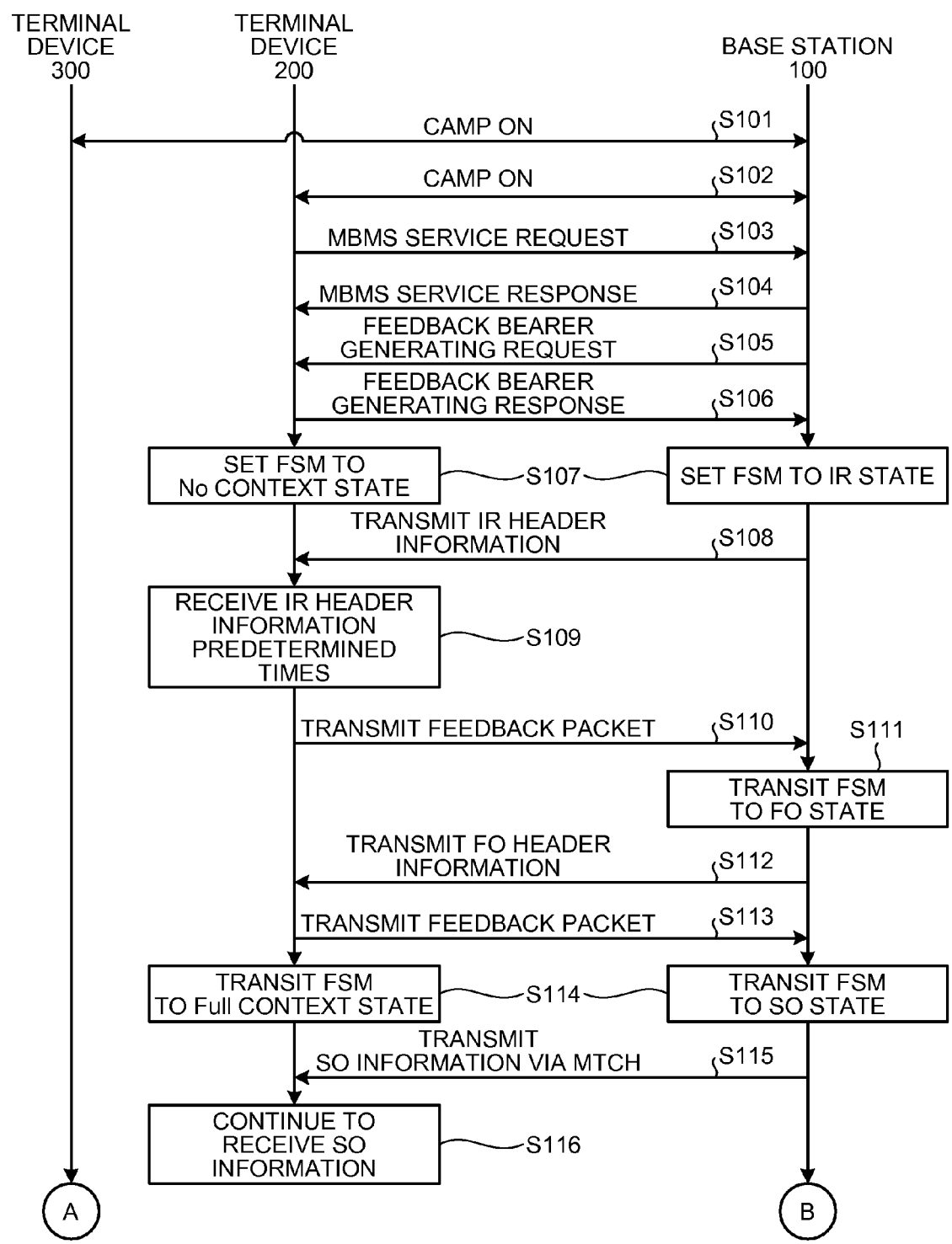
FIG. 11 is a sequence diagram (1) of a processing procedure of the MBMS system according to the present embodiment.
Figure 12:
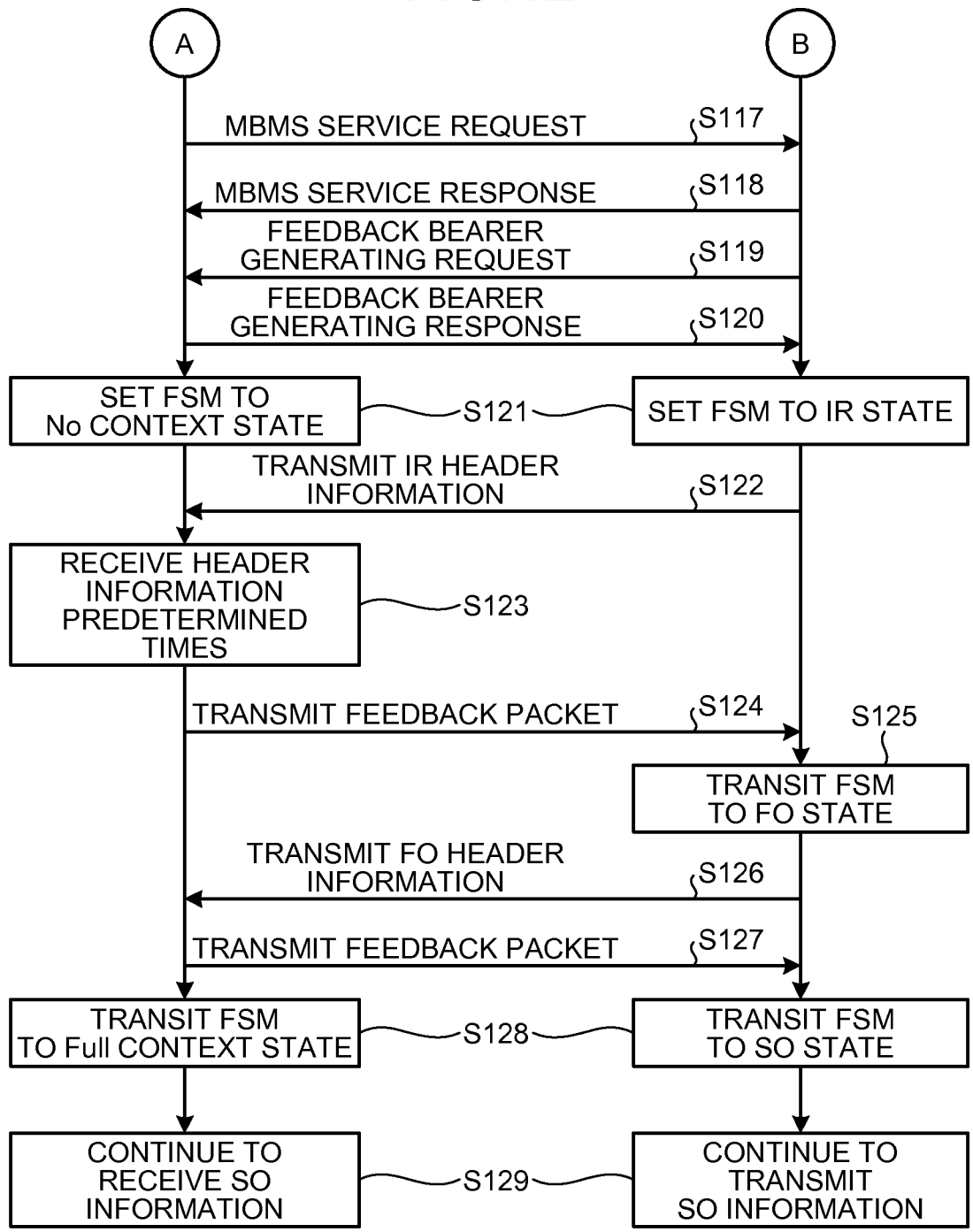
FIG. 12 is a sequence diagram (2) of a processing procedure of the MBMS system according to the present embodiment.

A processing procedure of the MBMS system according to the present embodiment will be below explained. FIGS. 11 and 12 are sequence diagrams of the processing procedure of the MBMS system according to the present embodiment. As illustrated, Camp ON is made between the terminal device and the base station 100 (radio-based access is completed) (Step S101) and Camp ON is made between the terminal device 200 and the base station 100 (Step S102).

The terminal device 200 makes a MBMS service request to the base station 100 (Step S103) and the base station makes a MBMS service response to the terminal device (Step S104). Subsequently, the base station 100 makes a Feedback bearer generating request to the terminal device 200 (Step S105) and the terminal device 200 makes a Feedback bearer generating response to the base station 100 (Step S106).

The terminal device 200 sets the state of its FSM to the No context state and the base station 100 sets the state of the FSM corresponding to the terminal device 200 to the IR state (Step S107), and the base station 100 transmits the IR header information to the terminal device (Step S108).

The terminal device 200 receives the IR header information predetermined times (for example, four times) (Step S109) and then transmits the Feedback packet (ACK) to the base station 100 (Step S110), and the base station 100 transits the state of the FSM corresponding to the terminal device 200 to the FO state (Step S111).

The base station 100 transmits the FO header information to the terminal device 200 (Step S112), the terminal device 200 transmits the Feedback packet (ACK) to the base station 100 (Step S113), the terminal device 200 transits the state of its FSM to the Full context state and the base station 100 transits the state of the FSM corresponding to the terminal device 200 to the SO state (Step S114).

The base station 100 continues to transmit the SO information via the MTCH to the terminal device 200 (Step S115) and the terminal device 200 continues to receive the SO information (Step S116).

On the one hand, the terminal device 300 makes a MBMS service request to the base station 100 (Step S117) and the base station 100 makes a MBMS service response to the terminal device 300 (Step S118). The base station 100 makes a Feedback bearer generating request to the terminal device 300 (Step S119) and the terminal device 300 makes a Feedback bearer generating response to the base station 100 (Step S120).

The terminal device 300 sets the state of its FSM to the No context state, the base station 100 sets the state of the FSM corresponding to the terminal device 300 to the IR state (Step S121), and the base station 100 transmits the IR header information to the terminal device 300 (Step S122).

The terminal device 300 receives the IR header information predetermined times (for example, four times) (Step S123) and then transmits the Feedback packet (ACK) to the base station 100 (Step S124), and the base station 100 transits the state of the FSM corresponding to the terminal device 300 to the FO state (Step S125).

The base station 100 transmits the FO header information to the terminal device 300 (Step S126), the terminal device 300 transmits the Feedback packet (ACK) to the base station 100 (Step S127), the terminal device 300 transits the state of its FSM to the Full context state, and the base station 100 transits the state of the FSM corresponding to the terminal device 300 to the SO state (Step S128).

The base station 100 continues to transmit the SO information via the MTCH to the terminal device 300 and the terminal device 300 continues to receive the SO information (Step S129).

In this manner, in the MBMS system according to the present embodiment, the base station 100 generates the FSM corresponding to the terminal device 200 and 300, utilizes each FSM to synchronize with each terminal device and transmits various packets to the terminal device, thereby improving the throughput for the content distribution.

As described above, in the MBMS system according to the present embodiment, the base station 100 generates the data control task 160, the first header control task 170a and the second header control task 170b corresponding to each terminal device 200 and 300 for the MBMS function module 140. Then, since each header control task 170a and 170b synchronizes the compression state with the associated terminal device 200 and 300 and transmits only the header information to the terminal device 200 and 300, and the data control task 160 distributes the content information to the terminal device 200 and 300 separately from the header information, the ROHC technique can be applied to the MBMS, thereby improving the throughput for the content distribution.

In the MBMS system according to the present embodiment, the terminal device 200 (base station 300) synchronizes the compression state with the first header control task 170a as the base station to receive the header information and elongates the SO information header transmitted via the MTCH based on the received header information to reproduce the contents, thereby applying the ROHC technique to the MBMS.

Among the respective processings explained in the embodiment, all or part of the processings explained to be automatically performed may be performed manually, or alternatively all or part of the processings explained to be manually performed may be performed automatically in a well-known manner. Additionally, the processing procedures, the control procedures, the specific names, and the information including various data or parameters depicted in the document and drawings may be arbitrarily changed unless otherwise specified.

Each component of the base station 100 depicted in FIG. 6 and the terminal device 200 depicted in FIG. 8 is functionally conceptual and does not need to be physically constituted as illustrated. In other words, the specific form of distribution or integration of each apparatus is not limited to the illustrated one and all or part of the form can be constituted to be physically distributed or integrated in arbitrary units depending on various loads or usage. Further, all or part of each processing function performed in each apparatus may be realized in a CPU or in a program which is analyzed and executed at the CPU, or alternatively may be realized in a wired logic hardware.

Figure 13:
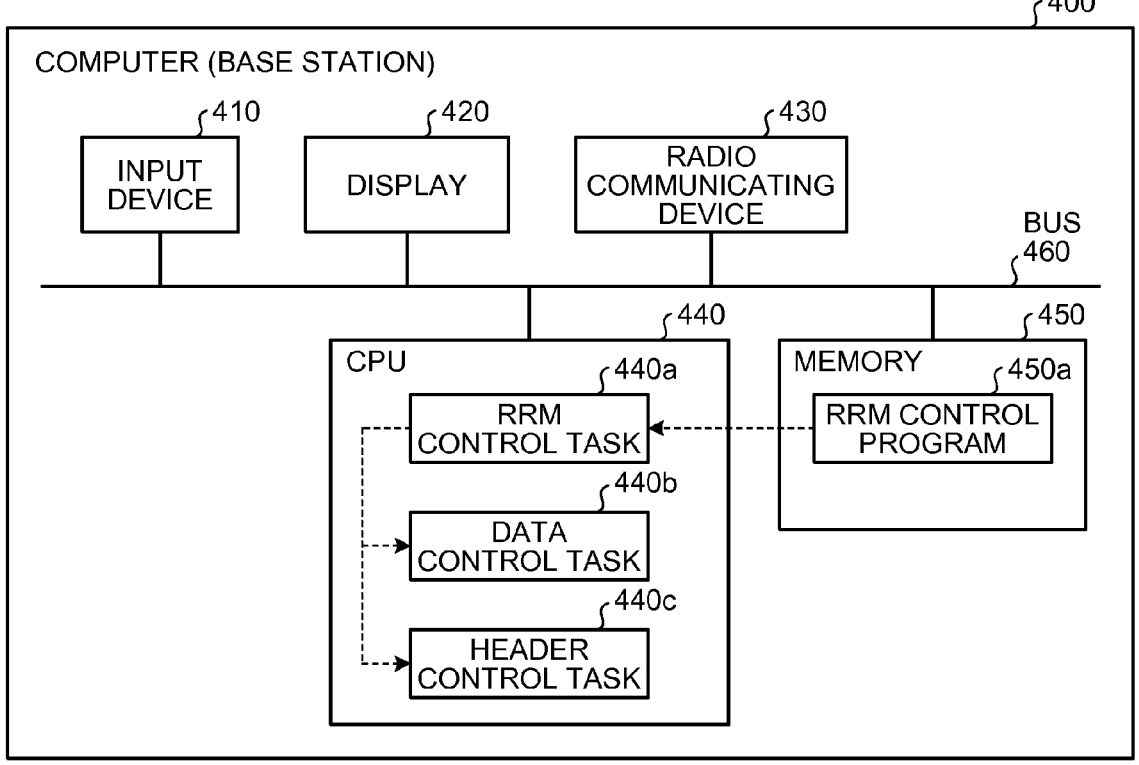
FIG. 13 is a diagram of a hardware structure of a computer which constitutes the base station illustrated in the present embodiment.
Figure 14:
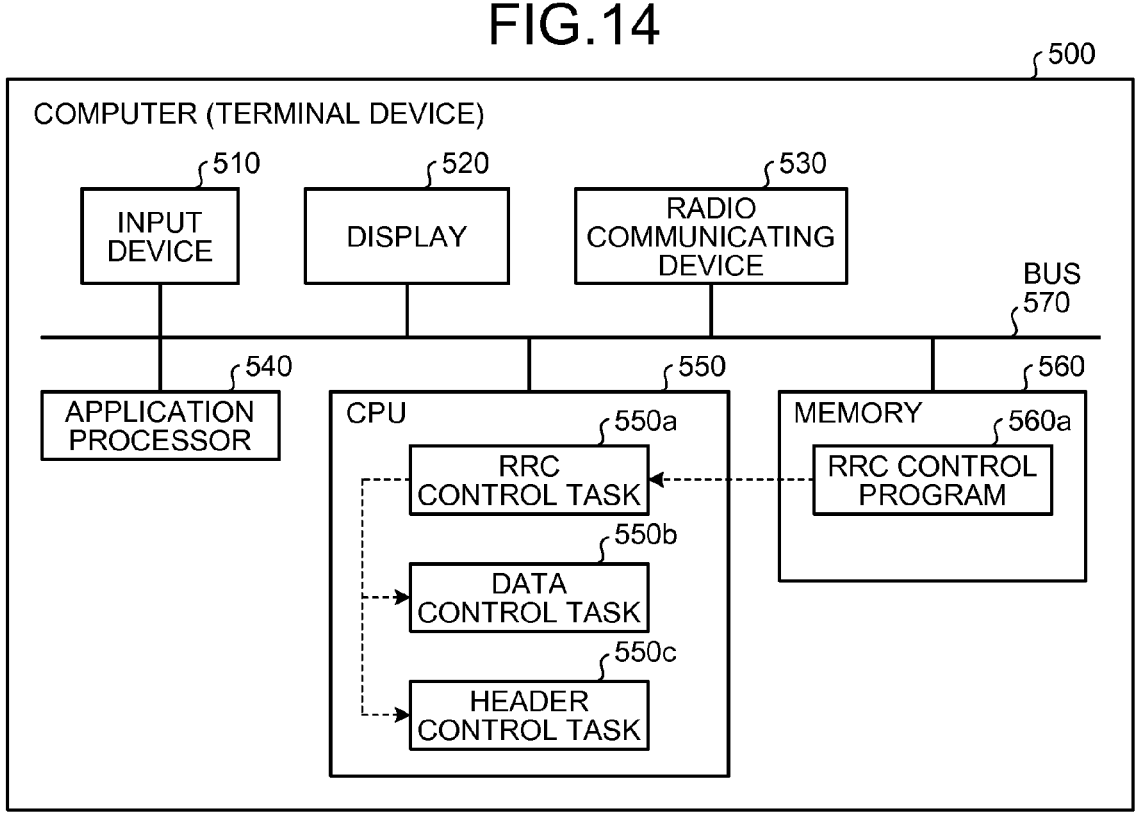
FIG. 14 is a diagram of a hardware structure of a computer which constitutes the terminal device illustrated in the present embodiment.
Figure 15:
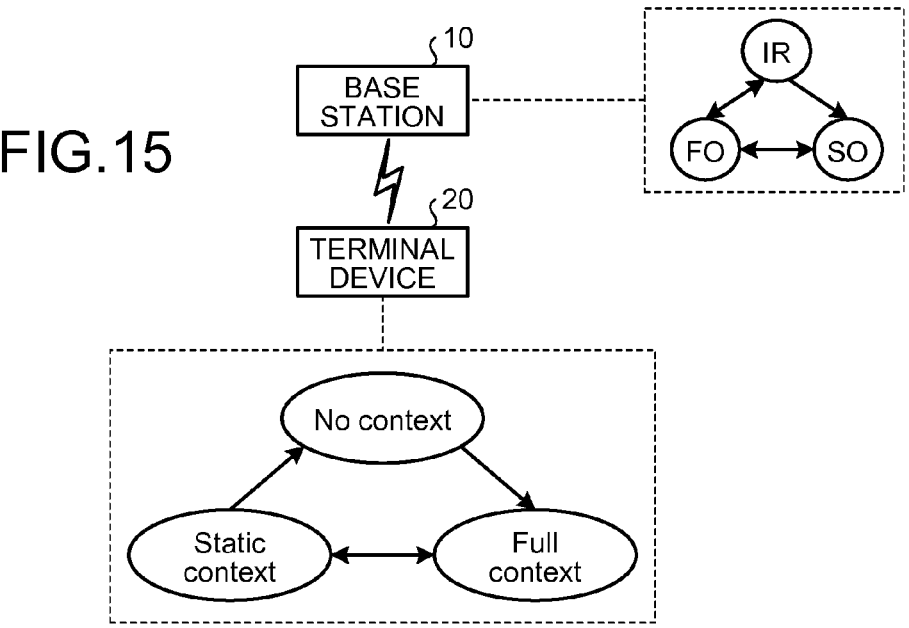
FIG. 15 is a diagram for explaining the base station for transmitting packets based on the ROHC and the terminal device for receiving the packets.
Figure 16A:
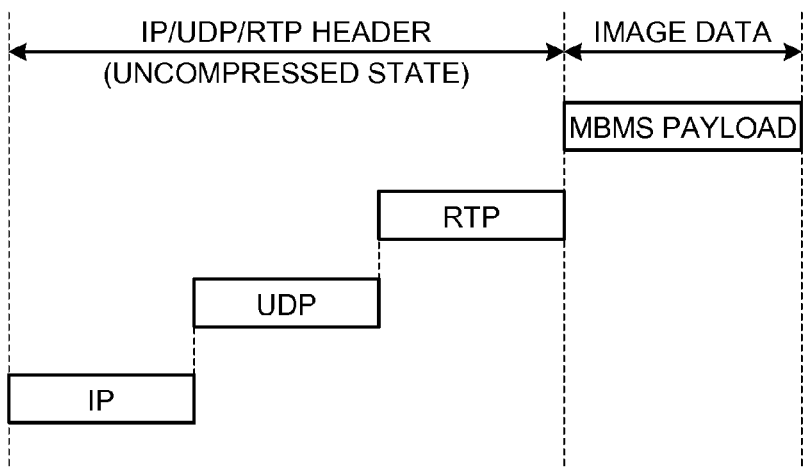
FIGS. 16A to 16C are diagrams of one example of data structure of a packet transmitted at each state.
Figure 16B:
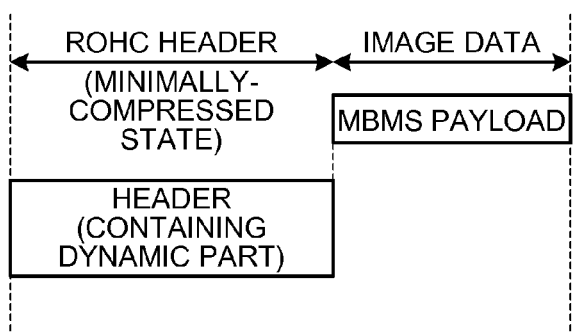
Figure 16C:
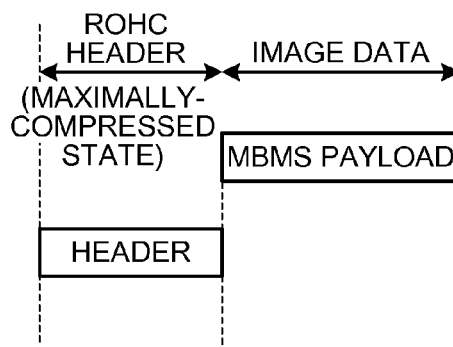
Figure 17:
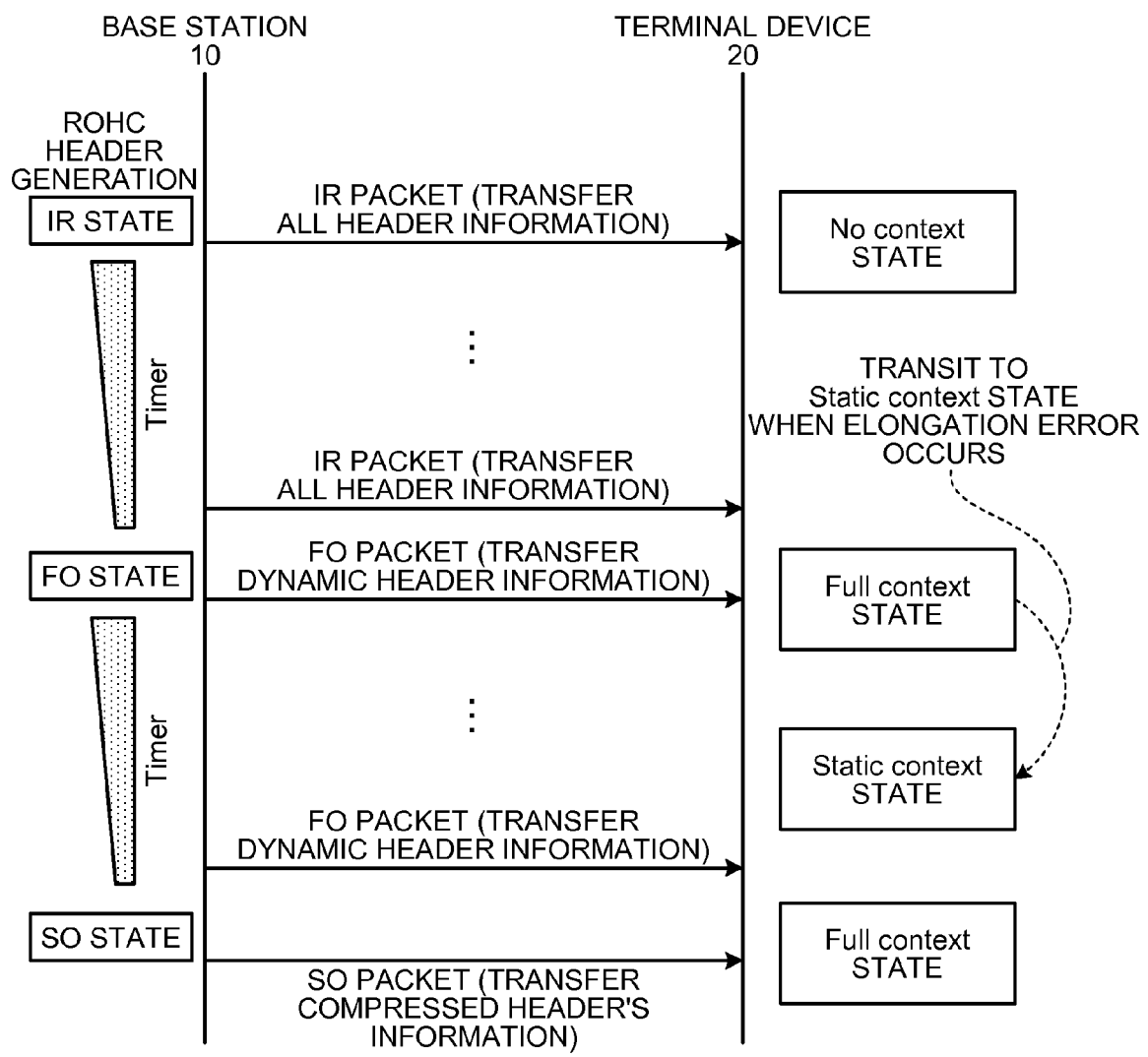
FIG. 17 is a diagram for explaining a state transition sequence of the ROHC.

FIG. 13 is a diagram (one example) of a hardware structure of a computer 400 constituting the base station 100 depicted in the present embodiment, and FIG. 14 is a diagram (one example) of a hardware structure of a computer 500 constituting the terminal device 200 depicted in the present embodiment. The hardware structure diagram corresponding to the terminal device 300 is similar to that of the terminal device 200.

As illustrated, the computer (base station) 400 connects an input device 410, a display 420, a radio communicating device 430 for making radio communication between the terminal devices 200 and 300, a CPU 440 and a memory 450 with one another via a bus 460. Other structure is similar to the structure of a well-know base station and explanation thereof will be omitted.

The CPU 440 reads out and executes a RRM control program 450a stored in the memory 450 to activate a RRM control task 440a. The RRM control task 440a corresponds to the RRM control unit 130 depicted in FIG. 6.

The RRM control task 440a generates a data control task 440b and a header control task 440c when starting the service for the terminal device 200 and 300 to synchronize the compression state with each terminal device and to distribute the header information and the contents. The data control task 440b and the header control task 440c correspond to the data control task 160 and the first or second header control task 170a, 170b depicted in FIG. 6.

Subsequently, as depicted in FIG. 14, the computer (terminal device) 500 connects an input device 510, a display 520, a radio communicating device 530 for making radio communication with the base station 100 and the like, an application processor 540 for receiving a MBMS request from a user, a CPU 550 and a memory 560 with one another via a bus 570. Other structure is similar to the structure of a well-known terminal device and explanation thereof will be omitted.

The CPU 550 reads out and executes a RRC control program 560a stored in the memory 560 to activate a RRC control task 550a. The RRC control task 550a corresponds to the data control task 260 depicted in FIG. 8.

The RRC control task 550a generates a data control task 550b and a header control task 550c when receiving the service from the base station 100 and synchronizes the compression state with the base station 100 to receive the header information and the content distribution and to elongate the compressed header for reproducing the contents.

The RRM control program 450a depicted in FIG. 13 and the RRC control program 560a depicted in FIG. 14 are not necessarily stored in the memories 450 and 560, respectively, from the beginning. For example, the RRM control program 450a or the RRC control program 560a is stored in a "portable physical medium" such as flexible disk (FD), compact disk-read only memory (CD-ROM), digital versatile disk (DVD), magnetooptical disk or integrated circuit (IC) card to be inserted into a computer, a "fixed physical medium" such as hard disk drive (HDD) to be provided inside or outside the computer, or "other computer (or server)" to be connected to the computer via a public line, Internet, local area network (LAN) or WAN, and the computer reads out and executes the RRM control program 450a or the RRC control program 560a from any of the above mediums.

According to an embodiment of the content distributing system, the content distributing apparatus has a plurality of header control units corresponding to a plurality of terminal devices, and the header control unit synchronizes the compression state with the terminal device to transmit header information to the terminal device and to distribute content information in addition to the header information to each terminal device, thereby improving the throughput for content distribution.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A content distributing system, comprising:
a plurality of terminal devices; and
a content distributing apparatus that distributes contents to the terminal devices, and that includes
a generating unit that generates a plurality of header control units associated with the terminal devices to which contents are distributed, and
a content distributing unit that distributes content information in which maximally-compressed header information and the contents are associated with each other to the terminal devices via a first channel,
the header control unit including
a determining unit that synchronizes a compression state with an associated terminal device and determines a compression state of a header to be transmitted to the terminal device, the compression state being any one of an uncompressed state containing static information and dynamic information, a minimally-compressed state containing only dynamic information and a maximally-compressed state containing neither static information nor dynamic information, and
a header distributing unit that compresses a header based on a determination result of the determining unit and distributes all header compression information as information on a compressed header to a terminal device associated with the header control unit separately from the content information via a second channel.

2. The content distributing system according to claim 1, wherein the terminal device comprises an elongating unit that elongates information on a maximally-compressed header contained in the content information based on the header compression information when receiving the content information and the header compression information.

3. A content distributing apparatus, comprising:
a generating unit that generates a plurality of header control units associated with the terminal devices to which contents are distributed, and
a content distributing unit that distributes content information in which maximally-compressed header information and the contents are associated with each other to the terminal devices via a first channel,
the header control unit including
a determining unit that synchronizes a compression state with an associated terminal device and determines a compression state of a header to be transmitted to the terminal device, the compression state being any one of an uncompressed state containing static information and dynamic information, a minimally-compressed state containing only dynamic information and a maximally-compressed state containing neither static information nor dynamic information, and a header distributing unit that compresses a header based on a determination result of the determining unit and distributes all header compression information as information on a compressed header to a terminal device associated with the header control unit separately from the content information via a second channel.

4. A content distributing method for a content distributing system comprising a plurality of terminal devices and a content distributing apparatus for distributing contents to the terminal devices, the content distributing method comprising:

generating a plurality of header control tasks associated with the terminal devices to which contents are distributed;

distributing content information in which maximally-compressed header information and the contents are associated with each other to the terminal devices via a first channel;

synchronizing a compression state with an associated terminal device and determining a compression state of a header to be transmitted to the terminal device, the compression state being any one of an uncompressed state containing static information and dynamic information, a minimally-compressed state containing only dynamic information and a maximally-compressed state containing neither static information nor dynamic information;

compressing a header based on a determination result; and distributing all header compression information as information on a compressed header to a terminal device associated with the header control task separately from the content information via a second channel.

5. The content distributing method according to claim 4, further comprising:

receiving the content information and the header compression information; and elongating information on a maximally-compressed header contained in the content information based on the header compression information.

* * * * *